XR 3,848,087

United Stat[es Patent]
Carrell

[11] 3,848,087
[45] Nov. 12, 1974

[54] OPTICAL SCANNER CONTROL SYSTEM

[75] Inventor: Ross Michael Carrell, Cinnaminson, N.J.

[73] Assignee: RCA Corporation, New York, N.Y.

[22] Filed: Oct. 29, 1973

[21] Appl. No.: 410,564

[52] U.S. Cl. .................. 178/7.6, 318/640, 346/108, 350/7, 350/285

[51] Int. Cl. .............................................. G08b 5/36

[58] Field of Search ................ 178/7.6; 350/285, 7; 346/108; 318/640

[56] References Cited

UNITED STATES PATENTS

| | | | |
|---|---|---|---|
| 3,597,536 | 8/1971 | Fowler | 178/7.6 X |
| 3,632,871 | 1/1972 | Watkins et al. | 350/285 X |
| 3,717,772 | 2/1973 | Engman | 178/7.6 X |
| 3,731,098 | 5/1973 | Hunt | 178/7.6 X |
| 3,770,890 | 11/1973 | Winkler | 178/7.6 |
| 3,776,640 | 12/1973 | Ikegami | 350/285 X |

*Primary Examiner*—David L. Trafton
*Attorney, Agent, or Firm*—Edward J. Norton; Joseph D. Lazar; Donald E. Mahoney

[57] ABSTRACT

An apparatus to synchronize a scanning light beam, reflected from a rotationally driven polygonal mirror, with means for processing signals manifesting optical information relating to the scanning light beam of the type operating under the control of timing signals. The optical information processing apparatus may be for example, a reading, writing or facsimile apparatus. When the light beam is deflected to the beginning of an area to be scanned, an oscillator is enabled to generate a pulse train which is used as the timing signals to clock the operation of the optical information processing means. After a predetermined number of pulses, a ramp signal is initiated. When the light beam is deflected to a second location, the magnitude of the ramp signal is compared to a reference signal to generate an error signal, if any. Any error signal is applied to a servo motor control circuit which in turn applies a motor control signal to a motor driving the polygonal mirror to regulate the speed of the rotating mirror.

7 Claims, 2 Drawing Figures

3848087
NO OR CLASSIF

PATENTED NOV 12 1974

3,848,087

SHEET 1 OF 2

OPTICAL SCANNER CONTROL SYSTEM

BACKGROUND OF THE INVENTION

1. Field of the Invention

This invention pertains to the field of scanning apparatus in which a reflected light beam from a rotationally driven polygonal mirror scans an object within a scanning area.

2. Prior Art

Scanning systems are known in which a light beam produced from a source such as a laser is reflected from a rotating polygonal or multifaced mirror to scan across an object such as a film within a scanning area. In a printing or writing system the light beam is modulated in accordance with signals manifesting image information, such as alphanumeric characters or the like, and the object is unexposed film or any other suitable recording or viewing medium. In a sensing or reading system, the light beam is usually unmodulated and the object is any object definable in terms of tonal gradations such as an original image stored on film or the like. In such reading systems optical sensors are arranged in relation to the object to detect light transmitted through or reflected from the object. Such reading and writing systems may be combined to form a facsimile system as is well known in the art.

In such aforementioned systems, it is necessary to synchronize the movement of the scanning beam across the object with the operation of the apparatus for processing signals manifesting optical information relating to the scanning beam. That is, for instance, in the writing system the information which modulates the light beam must be synchronously applied to the modulating device as the unexposed film is scanned. Thus, the scanning beam must be positioned and maintained at a speed in a controlled relationship to the optical information processing apparatus.

In prior art scanning systems polygonal mirrors having extremely tight tolerances imposed on the angles between the mirror faces have been utilized in conjunction with well known motor speed control servo systems to maintain synchronism between the scanning beam and the utilization device. These systems are expensive primarily because of the high cost of implementing such tightly toleranced polygonal mirrors. Therefore, there is a need in the art for an optical scanning system which does not require a tight tolerance on the angles between the faces of the polygonal mirrors.

SUMMARY OF THE INVENTION

In a scanning system in which a light beam is reflected from a rotating polygonal mirror to scan across a scanning area, a synchronization apparatus is provided to synchronize the scanning light beam with the operation of an apparatus for processing signals manifesting optical information relating to the scanning light beam of the type operating under the control of timing signals. The optical information processing apparatus may be, for example, a computer controlled printing apparatus including a memory storing a font of characters. The synchronization apparatus includes means for detecting when the scanning beam has reached the beginning of the scanning area. When the beam reaches the beginning of the scanning area, an oscillator is enabled to oscillate and thereby generate a pulse train. The pulse train is applied to the control logic of the optical information processing apparatus as the timing signal for the optical information processing apparatus to thereby initiate the operation of the optical information processing apparatus when the scanning beam begins scanning the scanning area.

In order to ensure that the speed of the scanning beam is locked with the operation of the optical information processing apparatus, the synchronization apparatus includes means to regulate the speed of a motor driving the polygonal mirror. Included within the speed regulation means is a ramp generator adapted to produce a signal whose magnitude increases with time after a predetermined number of pulses have been generated by the oscillator. Means for detecting when the scanning beam has reached a second location beyond the beginning of the scanning area is adapted to enable the ramp signal to be compared to a speed reference signal when the scanning beam reaches the second location. Any difference between the ramp signal and the speed reference signal is applied to a motor servo system as an error signal to regulate the speed of the motor.

Figure 1:
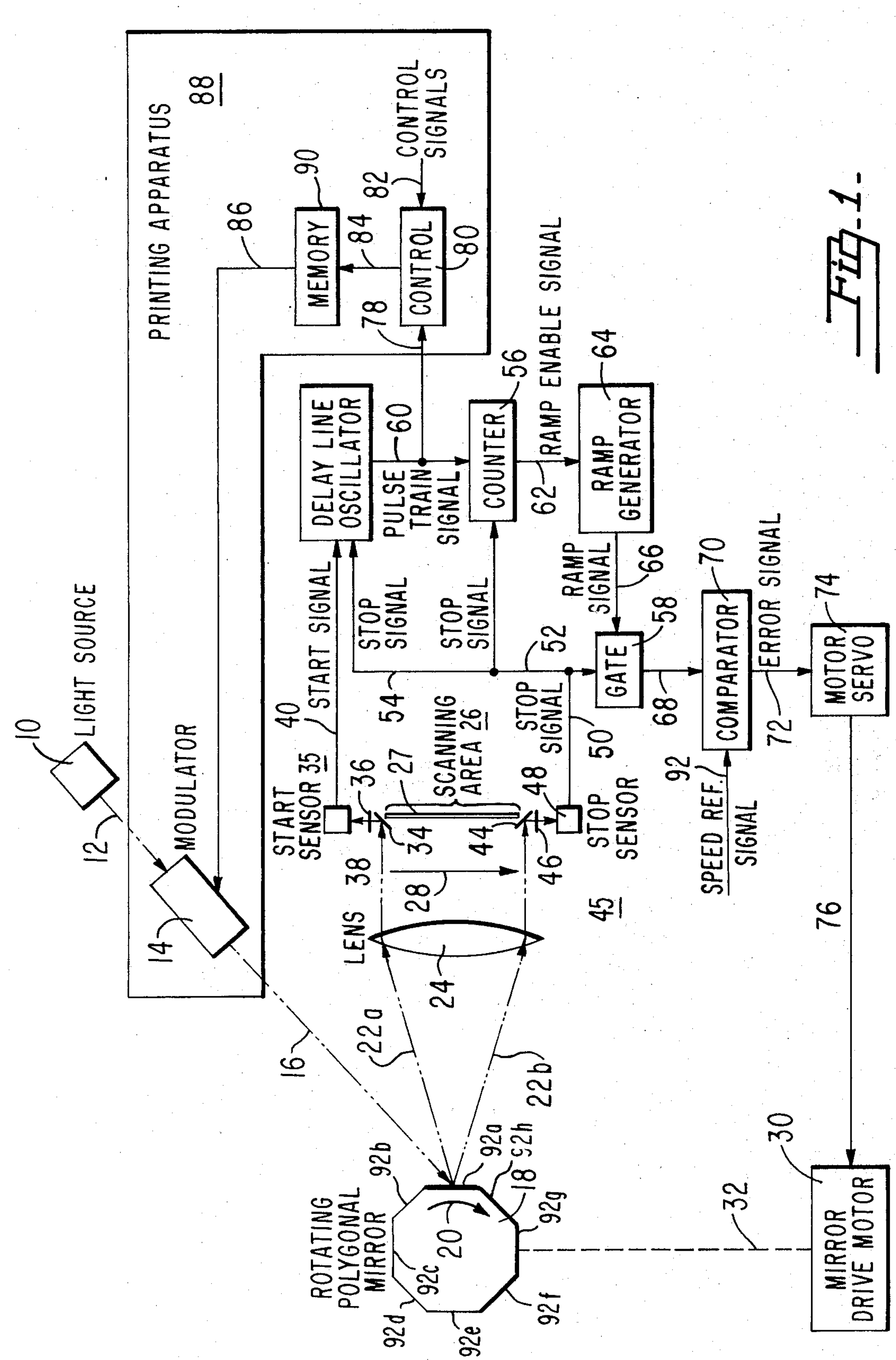
FIG. 1 is a block diagram of a printing system including an optical scanning system embodying the invention.
Figure 2:
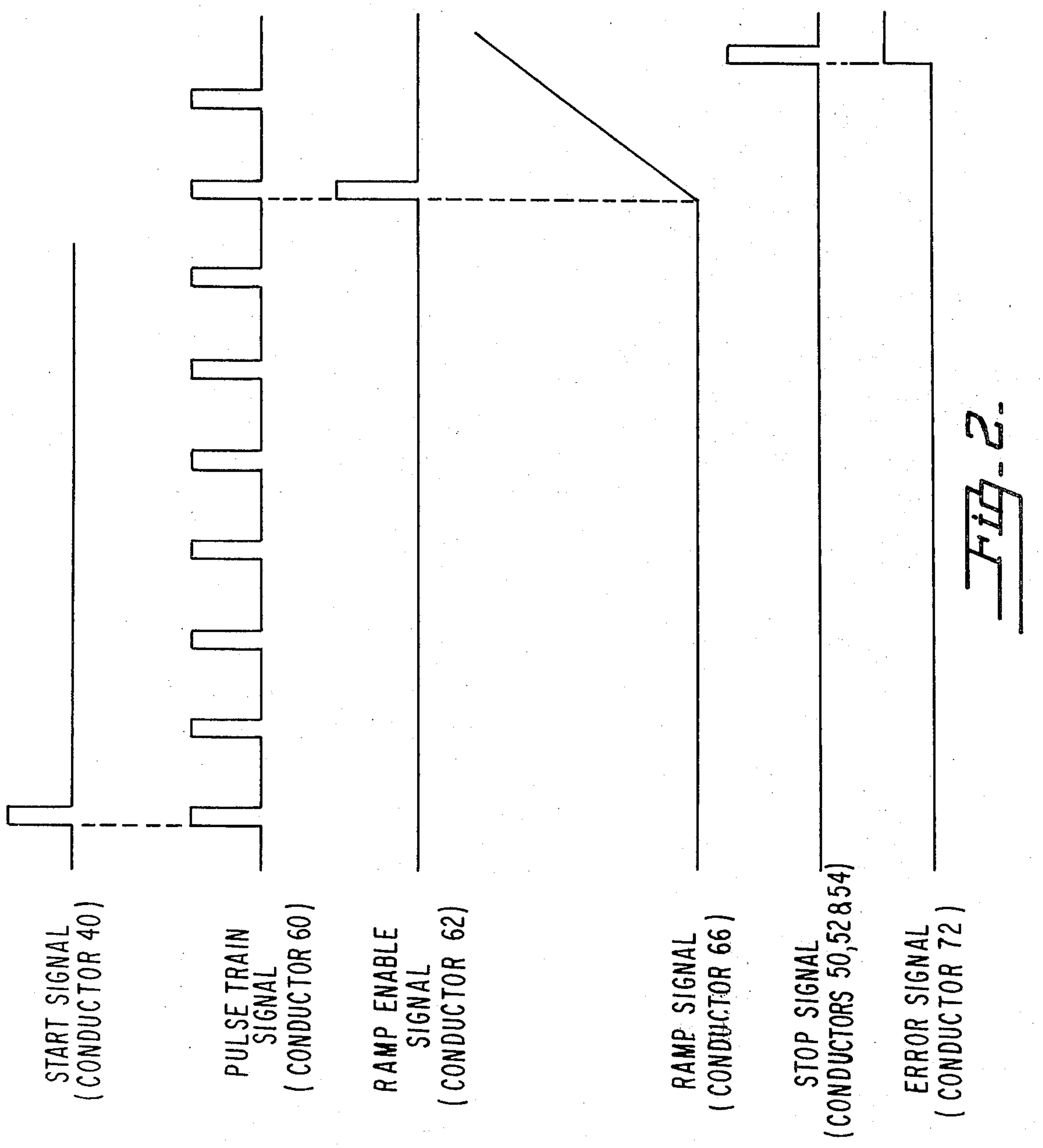
FIG. 2 is a timing diagram useful in understanding the block diagram of FIG. 1.

During the following description concurrent reference to FIGS. 1 and 2 should be made to facilitate understanding of the preferred embodiment of the invention shown in FIG. 1.

DETAILED DESCRIPTION OF THE PREFERRED EMBODIMENT

Light source 10 emits beam 12 which is modulated by modulator 14 in accordance with modulator control signals which are coupled to modulator 14 through conductor 86. Light source 10 may, for example, be a laser light source and modulator 14 may be any suitable modulator which is capable of modulating the intensity or beam width of beam 12. The signals conducted through conductor 86 are signals suitabe for operating a laser modulator 14 as are well known in the art. These signals are generated by suitable optical information processing apparatus of the type operating under the control of timing signals such as printing apparatus 88 which is of the type including a digital control unit 80 and memory 90 as well as modulator 14. Control unit 80 applies memory control signals to memory 90 through multiple conductor path 84. Memory 90 stores information manifesting a font of characters and when called upon by control unit 80, transmits the information necessary to write these characters to modulator 14. Control unit 80 receives printing control signals to control such printing parameters such as the point size of the characters and the like through multiple conductor path 82. A system of this general type is described in detail in U.S. Pat. No. 3,614,767, entitled "Electronic Photocomposing System That Forms Characters of Different Point Sizes," issued to the same inventor as the present invention, on Oct. 19, 1971, and assigned to the same assignee as the present assignee. Although this patent describes a printing system utilizing a CRT flying spot scanner, it will be appreciated by those skilled in the art that the digital control circuits and memory described therein are equally applicable for use with an optical scanner.

Modulated light beam 16 is emitted from modulator 14 and impinges on one of the reflective faces 92*a* through 92*h* of rotating polygonal mirror 20. Rotating polygonal mirror 20 is shown having eight faces, but in general, may have any number of faces. Rotating polygonal mirror 18 is supported by shaft 32 which is driven by drive motor 30 in a direction indicated by arrow 20.

Light beam 22*a* is reflected from surface 92*a* and passes through focusing lens 24 to focus within scanning area 26. As polygonal mirror 18 rotates, light beam 22*a* scans across the scanning area 26 in direction 28 from the beginning of the scanning area (indicated by the position of light beam 22*a*) to the end of the scanning area 26 (indicated by the position of light beam 22*b*). Scanning area 26 contains unexposed film 27 or other suitable recording medium which is written on in accordance with the information manifested in modulated scanning beam 22.

A start sensor 35 includes a half-silvered mirror 34 positioned at a 45° angle relative to light beam 22*a*, a plate 36 having an aperture therein to permit the passage of light therethrough and photodetector 38 located to receive light passing through the aperture of plate 36. Mirror 34 allows for the passage of a portion of light beam 22*a* while reflecting a portion of light beam 22*a*. Photodetector 38 may be any suitable device capable of transforming light energy into electrical energy such as a phototransistor, photodiode or the like. Stop sensor 45 comprising photosensitive element 48, aperture plate 46 and mirror 34 is arranged in a similar manner to start sensor 35 to detect when scanning beam 22*b* passes through the end of scanning area 26.

The start signal generated by start sensor 35 when exposed to beam 22*a* is conducted through conductor 40 to oscillator 42. Oscillator 42 is of any suitable type which may be caused to oscillate upon the application of an input signal and which begins to oscillate almost instantly upon the application of that input signal. For example, oscillator 42 may be a delay line oscillator consisting of a delay line with feedback circuitry to feed pulses baCk from its output to its input wherein a pulse introduced recirculates endlessly thereby generating an output pulse train.

The output of oscillator 42 is conducted to control unit 80 of printing apparatus 88 through conductor 78 and forms the timing clock pulse signal for control unit 80. The operation of printing apparatus 88 is initiated by the start signal occurring when beam 22*a* crosses the beginning of scanning area 26 and is thereafter locked to the pulse train output of oscillator 42.

The pulse train output of oscillator 42 is also conducted to counter 56 through conductor 60. Counter 56 is a digital counter and is adapted to count to a predetermined number which is preset into the counter as is well known in the digital art. Considerations in selecting the number to which counter 56 is preset will be discussed infra. When counter 56 reaches the predetermined number, counter 56 generates a ramp enable signal conducted to ramp generator 64 through conductor 62.

When ramp generator 64 receives the ramp enable signal, a linear ramp signal is initiated and conducted through conductor 66 to gate 58. As is well known in the art, a ramp signal is a signal whose magnitude increases linearly as a function of time. Ramp generator 64 may be any suitable circuit for generating ramp signals such as an R–C circuit in combination with an operational amplifier.

When beam 22*b* reaches the end of scanning area 26, stop sensor 45 generates a stop signal which is conducted to oscillator 42 through conductor 54, to counter 56 through conductor 52 and to gate 58 through conductor 50. The stop signal stops oscillator 42 from oscillating and resets counter 56 while enabling gate 58.

Gate 58 is any suitable switch of the single throw, single pole type and is adapted to allow the ramp signal to pass to comparator 70 through conductor 68 upon the occurrence of the stop signal.

Comparator 70 is a conventional comparator, as is well known in the art, used to compare voltages and may comprise a differential amplifier. Comparator 70 compares the magnitudes of the ramp signal and a reference signal manifesting the desired speed of the motor conducted thereto through conductor 92 and produces a difference signal if a difference exists. Any such difference signal is conducted to motor servo unit 74 through conductor 72. This difference signal is conducted to motor servo 74 through conductor 76 and utilized by motor servo 74 as an error signal to change the speed of drive motor 30 accordingly. Thus, if there is any difference between the ramp signal and the reference signal at the time the stop signal occurs, the speed of the motor is changed to thereby change the scanning speed of beam 22 accordingly.

As explained above the purpose of start sensor 35 is to initiate the operation of the utilization device, in this case printing apparatus 88, while the purpose of stop sensor 45 is to sample the speed of scanning and to generate an error signal to correct the scanning speed if the scanning speed is incorrect. It should be noted, however, that stop sensor 45 may be located at any portion of the scanning area and is not necessarily located only at the end of the scanning area. However, stop sensor 45 is preferably located at the end of scanning area 46 to avoid any optical problems caused by the interference of an object such as film within the scanning area by preventing light from reaching stop sensor 45. It should be noted that if stop sensor 35 is located within scanning area 26, mirror 44 should preferably be a partially reflecting mirror adapted to allow from 90 to 99 percent of beam 22 to pass to photosensitive element 48. Since the scanning beam is very intense, a small loss of light will not adversely effect the writing process.

It should be noted that counter 56 is not necessary because the ramp utilized in speed regulation may be initiated upon the occurrence of the start signal rather than upon the occurrence of the stop signal. It is preferred, however, that counter 56 be provided and preset to a number slightly less than the number of picture elements in a complete scan line. It will be appreciated by those skilled in the art that a scan line may be divided to a number of equal picture elements. If counter 56 is preset to a number slightly lower than the number of pictures in a scan line, the ramp signal occurs only during a brief portion of the scan line (at the end of the scan line) thereby minimizing the possibility of the accumulation of noise and other errors which would result in an incorrect error signal.

It should now be appreciated that in accordance with the present invention a scanning apparatus is provided that automatically synchronizes an optical signal processing apparatus with a scanning beam reflected from a rotationally driven polygonal mirror not withstanding inaccuracies of the angles between faces of the mirror. Thus, according to the invention, a relaxation of the tolerance on the angles between mirror faces is achieved by initiating the timing sequence of the optical signal processing apparatus at the arrival of the scanning beam at the beginning or leading edge of the area to be scanned, and measuring the speed of the scanning beam and accordingly correcting the angular velocity of the rotating mirror independently of the tolerance of the angles between the mirror faces. That is, the measurement of the angular velocity of the rotating mirror is dependent only on the transit time of the beam 22 across the scanning area 26 and is therefore independent of the angular tolerance between mirror faces; that this angular velocity will be sampled as many times per revolution as there are mirror faces; and that these and other properties of the invention are favorable to the realization of a low cost, high performance scanning system with a low if not a minimum number of sources of internal noise perturbations in the scanning control system.

It will be appreciated that although the embodiment of the invention was described with reference to a printing apparatus, the invention is not so limited and printing apparatus 88 may be replaced by any one of a variety of suitable utilization devices such as apparatus for reproducing an original by known photocomposition techniques.

What is claimed is:

1. In a scanning system wherein a polygonal mirror is rotational driven by a motor to scan a reflected light beam across a scanning area having a leading edge and including optical signal processing means for processing signals manifesting optical information relating to said scanning light beam of the type operating under the control of timing signals the improvement comprising:

start detection means for producing a start signal when said light beam is deflected over said leading edge of said scanning area;

stop detection means for producing a stop signal when said light beam is deflected over a location after said beginning;

oscillator means responsive to said start signal and said stop signal for producing a pulse train signal starting when said start signal is received and ending when said stop signal is received;

said pulse train being coupled to said optical signal processing means to form said timing signals to thereby initiate the operation of said optical signal processing means;

means responsive to said pulse train signal for generating a ramp signal whose magnitude increases with time when a predetermined number of pulses in said pulse train signal have been received by said ramp generating means;

means responsive to said stop signal and said ramp signal for comparing said ramp signal to a predetermined reference signal when said stop signal is received to produce an error signal; and motor servo means responsive to said error signal and coupled to said motor for changing the speed of said motor in accordance with said error signal to null said error signal.

2. The combination recited in claim 1 wherein said means for generating a ramp signal includes:

counter means responsive to said stop signal and said pulse train signal for counting the number of pulses in said pulse train signal, said counter means generating a ramp enable signal when said counter has reached a predetermined count, said counter being reset when said stop signal is received; and ramp generating means responsive to said ramp enable signal for generating a ramp signal whose magnitude increases linearly with time when said ramp enable signal is received.

3. The combination recited in claim 2 wherein said stop means is adapted to produce a stop signal when said light beam is located at the end of said scanning area.

4. The combination recited in claim 3 wherein said light beam scans said scanning area along a scan line, said scan line containing a number of picture elements, and said predetermined count is equal to a number slightly less than the number of picture elements in a scan line.

5. The combination recited in claim 1 wherein said start detection means includes a first plate having an aperture adapted to allow the passage of said light beam therethrough when said light beam is located at the beginning of said scanning area, and first photosensitive means for receiving the light emerging from said first plate and producing said start signal therefrom; and said stop detection means includes a second plate having an aperture adapted to allow the passage of said light beam therethrough when said light beam is located at a location within said scanning area and after said beginning; second photosensitive means for receiving the light emerging from said second plate and producing said stop signal therefrom.

6. The combination recited in claim 1 wherein said utilization means is a printing apparatus including memory means for storing information manifesting a font of characters;

control means responsive to control signals said pulse train signal for reading out said information from said memory means in synchronism with said pulse train signal; and modulation means responsive to said information read out from said memory means for modulating said light beam in accordance with said information.

7. The combination recited in claim 1 wherein said comparator means includes:

switch means having input, output and control terminals, said ramp signal being coupled to said input terminal, said stop signal being coupled to said control terminal, said switch means being adapted so that said ramp signal is conducted from said input terminal to said output terminal only upon the occurrence of stop signal;

comparator means coupled to said output terminal and responsive to said predetermined reference signal for comparing said ramp signal to said predetermined reference signal to produce said error signal.

* * * * *